March 9, 1948.  L. W. TRIPP  2,437,338
ENDLESS TRACK FOR VEHICLES
Filed April 6, 1944  2 Sheets-Sheet 1
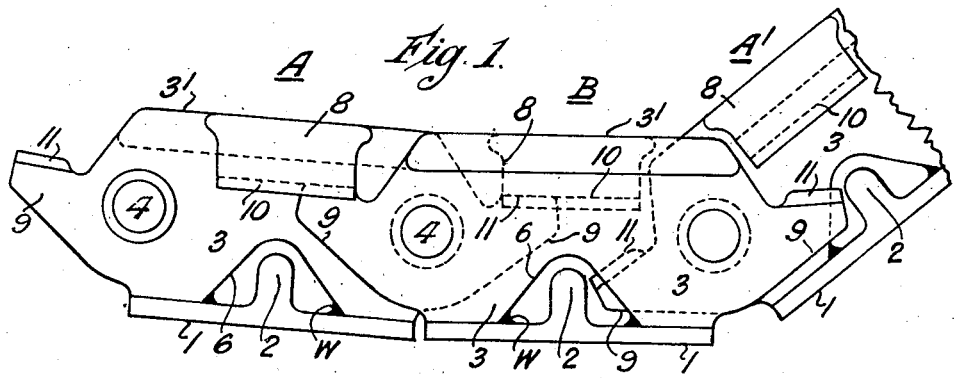
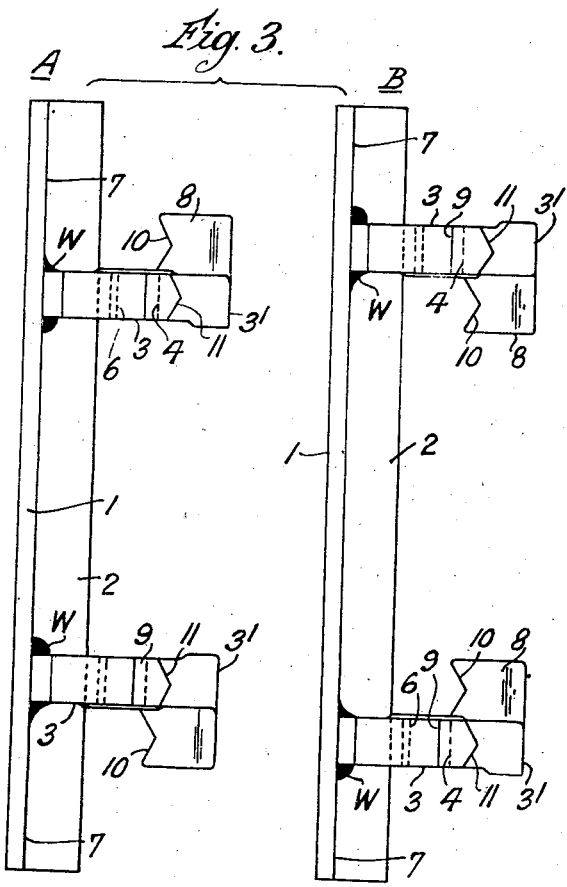
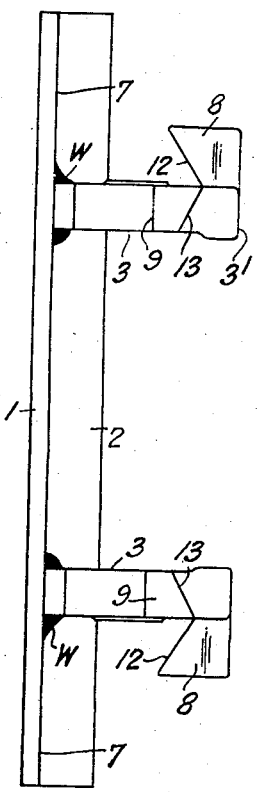
Inventor:
Leonard William Tripp,
By his attorneys,
Baldwin & Wight

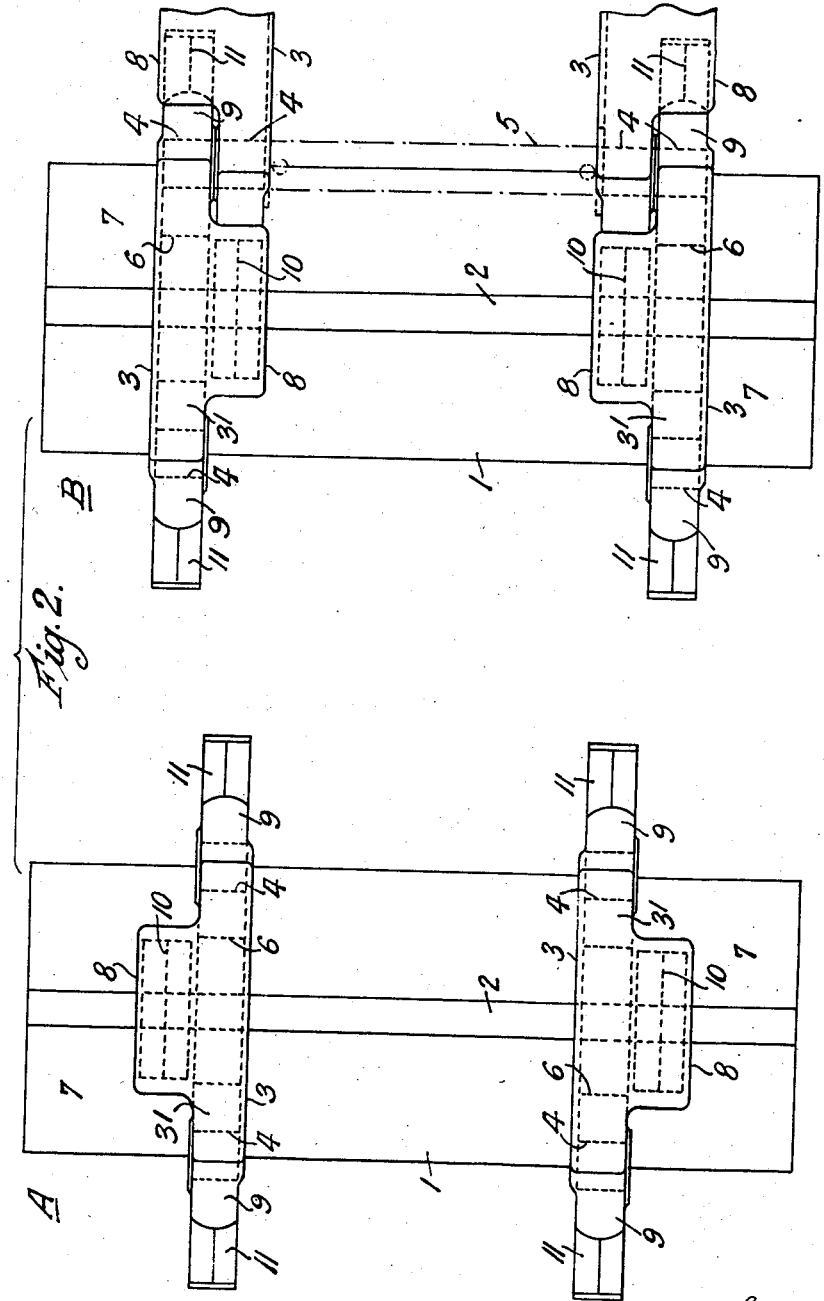

Patented Mar. 9, 1948

2,437,338

UNITED STATES PATENT OFFICE 2,437,338

ENDLESS TRACK FOR VEHICLES

Leonard William Tripp, Hounslow, England, assignor to Roadless Traction Limited, Hounslow, England Application April 6, 1944, Serial No. 529,782
In Great Britain September 4, 1942

5 Claims. (Cl. 305—10)

This invention relates to endless tracks of the locked girder type; that is to say those in which the links have abutments which engage with one another to limit the extent of the pivotal movement of the links, the abutments being so formed that the track is laid upon the ground to a predetermined arc which may be the equivalent of the rim of a wheel of very large diameter.

The invention concerns an improved construction of link suitable for but not necessarily limited to the manufacture of comparatively small sizes of track unit.

The characterising feature of links according to the invention for endless tracks of the locked girder type is that they are fabricated from separately made ground plates and side members assembled and secured together, the tops of the side members serving to provide the roller path, and abutment faces being provided at the ends of the side members, or extensions thereof, and on overhanging lateral extensions of the side members.

The side members may be manufactured as stampings or castings, or they may be fabricated or machined from a rolled section.

The ground plates, or shoes, may be manufactured as a rolled section or they may be manufactured by pressing or casting.

Preferably the ground plates are welded to the side members but alternatively they may be riveted or bolted.

In one form of construction according to the invention, the ground plate is of the form of a flat plate with an integral upstanding rib transversely formed thereon, whilst the side members, formed with apertures to provide bearings for the hinge pins and cut-away centrally at the bottom edge to bridge the rib on the ground plate, are welded at the bottom edges to the ground plate so that the latter extends a certain distance outwardly beyond the side members. The side members of successive links are positioned on their respective ground plates so that they alternately overlap or are overlapped. Accordingly the side members of alternate links are provided on the one hand with overhanging lateral projections extending outwardly from the side members and on the other hand with lateral overhanging projections extending inwardly of the side members, so that these overhanging extensions will engage with corresponding abutments on or at the ends of the side members.

Preferably the abutment faces, instead of being flat, are of V-shape, respectively raised and recessed, with the object of preventing lateral movement between the abutting faces such as might otherwise take place especially when the track unit is steered and there is a tendency for the track to try and flex laterally, i. e., to lay itself in a curve in plan.

The invention is illustrated by way of example in the accompanying drawings in which:

Figure 1 shows in side elevation links A and B in the locked position and part of a third link A' in the displaced position;

Figure 2 shows the links A and B in plan view and

Figure 3 the links A and B in end view;

Figure 4 is an end view of a modified form of link.

In the construction illustrated the links are fabricated and are constituted by a ground plate 1 having an upstanding transverse rib 2 formed integral thereon. The side members 3 are formed with apertures 4 to provide bearings for the hinge pins, one of which is shown in chain lines at 5 (Figure 2), and are cut away centrally at 6 at the bottom edges to bridge the rib 2 on the ground plate 1. The side members are welded along their bottom edges as indicated at W to the ground plate, so that the latter extends a certain distance outwardly beyond the side members as shown at 7. The side members of successive links are so positioned on their respective ground plates, that they alternately overlap or are overlapped, the tops 3' of the members serving to provide the roller path. Further the side members are provided with overhanging lateral extensions 8, the extensions on the side members of alternate links projecting outwardly and the extensions on the side members of the intermediate links projecting inwardly, so that the overhanging extensions will engage with corresponding abutments on the end 9 of the side members 3.

The abutment faces 10 on the overhanging extensions 8 and the corresponding abutment faces 11 on the ends 9 may be flat, but are preferably, as shown in Figures 1–3, of V-formation. In Figure 4 the abutment faces 12 on the overhanging extensions 8 and the corresponding abutment faces 13 on the ends 9 oppose one another on opposite sides of the link.

What I claim is:

1. Links for endless tracks of the locked girder type comprising ground plates and, secured thereto, separately formed upstanding side plates which on successive links are positioned so that they alternately overlap or are overlapped in the lateral direction, lateral extensions on said side plates which project from the upper part of the latter and overhang the lower part thereof, and abutment faces being provided on the tops of the ends of the side plates and on the undersides of the lateral extensions of the side plates, the abutment faces on the ends of the side plates being positioned to cooperate with the abutment surfaces on the undersides of the lateral extensions on side plates of an adjacent connected link to limit the extent of pivotal movement of the links and thus give the endless track its locked girder characteristic.

2. Links as claimed in claim 1 in which the tops of the side members and of their lateral extensions are adapted to provide a roller path.

3. Links as claimed in claim 1 in which the abutment faces have matching slopes relative to the horizontal in the transverse direction.

4. Links as claimed in claim 1 in which the abutment faces are of V-formation.

5. Links as claimed in claim 1 in which the abutment faces have slopes opposing one another on the opposite sides of the link.

LEONARD WILLIAM TRIPP.

REFERENCES CITED

The following references are of record in the file of this patent:

UNITED STATES PATENTS

| Number | Name | Date |
| --- | --- | --- |
| 1,314,649 | Holt | Sept. 2, 1919 |
| 1,344,398 | Holt | June 22, 1920 |
| 1,597,389 | Penn | Aug. 24, 1926 |
| 1,872,819 | Rorabeck | Aug. 23, 1932 |